US006956620B2

(12) United States Patent
Na

(10) Patent No.: US 6,956,620 B2
(45) Date of Patent: Oct. 18, 2005

(54) APPARATUS FOR SEPARATING A LUMINANCE SIGNAL AND A CHROMINANCE SIGNAL FROM AN NTSC COMPOSITE VIDEO SIGNAL

(75) Inventor: Woon Na, Seoul (KR)

(73) Assignee: Samsung Electronics Co., Ltd., (KR)

( * ) Notice: Subject to any disclaimer, the term of this patent is extended or adjusted under 35 U.S.C. 154(b) by 624 days.

(21) Appl. No.: 10/008,821

(22) Filed: Nov. 13, 2001

(65) Prior Publication Data

US 2002/0126223 A1     Sep. 12, 2002

(30) Foreign Application Priority Data

Mar. 12, 2001  (KR) ................................. 2001-12631

(51) Int. Cl.[7] ............................................. H04N 9/78
(52) U.S. Cl. ...................................................... 348/663
(58) Field of Search ............................... 348/663, 669, 348/6, 670, 631, 664, 609

(56) References Cited

U.S. PATENT DOCUMENTS

| | | | | |
|---|---|---|---|---|
| 4,641,180 A | * | 2/1987 | Richter ........................ 348/669 |
| 4,707,732 A | | 11/1987 | Matono et al. ................ 358/31 |
| 4,855,815 A | | 8/1989 | Yasuki et al. .................. 358/31 |
| 5,029,001 A | * | 7/1991 | Tanaka et al. ............... 348/447 |
| 5,091,783 A | * | 2/1992 | Miyaguchi .................... 348/24 |
| 5,134,467 A | * | 7/1992 | Kim ............................. 348/663 |
| 5,155,583 A | * | 10/1992 | Yoshimura et al. ........... 348/665 |
| 5,345,276 A | | 9/1994 | Hong .......................... 348/663 |
| 5,355,176 A | * | 10/1994 | Inagaki et al. .............. 348/609 |
| 5,475,445 A | * | 12/1995 | Yamaguchi et al. ......... 348/663 |
| 5,654,770 A | | 8/1997 | Hatano et al. ............... 348/668 |
| 5,686,972 A | * | 11/1997 | Kim ............................ 348/663 |
| 5,909,255 A | * | 6/1999 | Hatano ........................ 348/663 |
| 6,738,097 B2 | * | 5/2004 | Satoh .......................... 348/663 |

FOREIGN PATENT DOCUMENTS

WO          WO 97/39589          10/1997          ............ H04N 9/78

* cited by examiner

Primary Examiner—Paulos M. Natnael
(74) Attorney, Agent, or Firm—Mills & Onello, LLP

(57) ABSTRACT

An apparatus for separating luminance and chrominance signals from an NTSC composite video signal includes first through fourth delayers connected to a digital composite video signal in series for delaying input signals each by 1, a first filter for separating a first chrominance signal from signals output from the first and second delayers; a second filter for separating a second chrominance signal from signals output from the second and third delayers, a vertical edge direction detector for detecting a vertical edge direction by receiving signals output from the second and fourth delayers and receiving the digital composite video signal, a multiplexer for outputting one of the first and second chrominance signals based on a signal output from the vertical edge direction, a chrominance signal outputting unit for receiving the output of the multiplexer and then outputting a perfect chrominance signal, and a luminance signal outputting unit for receiving the signal of the second delayer and receiving the chrominance signal and then outputting a perfect luminance signal. Using the apparatus, cross-luminance and cross-chrominance can be substantially eliminated from the chrominance and luminance signals.

14 Claims, 4 Drawing Sheets

APPARATUS FOR SEPARATING A LUMINANCE SIGNAL AND A CHROMINANCE SIGNAL FROM AN NTSC COMPOSITE VIDEO SIGNAL

BACKGROUND OF THE INVENTION

1. Field of the Invention

The present invention relates to an apparatus for separating a luminance signal and a chrominance signal, and more particularly, to an apparatus for separating a luminance signal and a chrominance signal from an NTSC composite video signal.

2. Description of the Related Art

In contemporary color television systems, a chrominance signal is superimposed on a luminance signal to provide a composite video signal. Meanwhile, an image system, such a monitor, outputs a composite Red(R)/Green(G)/Blue(B) signal. The composite RGB signal is generated from the luminance and chrominance signals. For this reason, color television receivers require a circuit adapted to separate the composite video signal into the luminance signal and the chrominance signal.

Owing to recent advances in digital techniques, conventional analog luminance/chrominance signal separating apparatus have developed into digital luminance/chrominance signal separating apparatus for separating the luminance and chrominance signals. The conventional analog luminance/chrominance signal separating apparatuses separate the composite video signal in a horizontal direction whereas the digital luminance/chrominance signal separating apparatuses separate the composite video signal in a vertical direction by the using line memories.

FIGS. 1 and 2 are block diagrams of conventional luminance/chrominance signal separating apparatuses. Referring to FIG. 1, a first conventional luminance/chrominance signal separating apparatus 101 includes a line memory 111, a low-pass filer 121, and subtractors 131 and 132. The line memory 111 delays a digital composite video signal VS1 by 1 horizontal period. The subtractor 131 subtracts the digital composite video signal VS1 from a signal S1, which is delayed by 1 horizontal period. The low-pass filter 121 filters a subtracted signal P1 and then outputs a chrominance signal C1. The subtractor 132 subtracts the chrominance signal C1 from the signal S1, which is delayed by 1 horizontal period, and then outputs a luminance signal Y1.

Referring to FIG. 2, a second conventional luminance/chrominance signal separating apparatus 201 includes line memories 211 and 212, subtractors 231, 232, and 233, an adder 241, and a low-pass filter 221. The line memory 211 delays a digital composite video signal VS1 by 1 horizontal period. The line memory 212 further delays a signal S1, which has already been delayed by 1 horizontal period, by 1 horizontal period. Thus, the line memory 212 outputs a signal S2 that is delayed by 2 horizontal periods. The subtractor 231 subtracts the digital composite video signal VS1 from the signal S1, which is delayed by 1 horizontal period. The subtractor 232 subtracts a signal S2, which is delayed by 1 horizontal period, from the signal S1, which is delayed by 2 horizontal periods. The adder 241 adds signals P1 and P2 output from the subtractors 231 and 232. The low-pass filter 221 filters a signal P3 output from the adder 241 to output a chrominance signal C1. The subtractor 233 subtracts the chrominance signal C1 from the signal S1, which is delayed by 1 horizontal period, to output a luminance signal Y1.

The luminance signal Y1 and the chrominance signal C1 exist in the same frequency band of the frequency spectrum. Thus, the luminance signal Y1 output from the apparatus shown in FIGS. 1 and 2 contains chrominance signal components, which is referred to as "cross-luminance". The chrominance signal C1 contains luminance signal components, which is referred to as "cross-chrominance". Cross-luminance and cross-chrominance degrade resolution in the vertical direction.

SUMMARY OF THE INVENTION

To solve the above problem, it is an object of the present invention to provide an apparatus for separating a luminance signal and a chrominance signal while minimizing cross-luminance and cross-chrominance and preventing resolution degradation.

Accordingly, to achieve the above object, there is provided an apparatus for separating luminance and chrominance signals. The apparatus includes: first, second, third, and fourth delayers connected to a digital composite video signal in series, the first, second, third, and fourth delayers for delaying input signals each by 1 horizontal period; a first filter for separating a first chrominance signal from signals output from the first and second delayers; a second filter for separating a second chrominance signal from signals output from the second and third delayers; a vertical edge direction detector for detecting a vertical edge direction by receiving signals output from the second and fourth delayers and receiving the digital composite video signal; a multiplexer for outputting the first or second chrominance signals based on a signal output from the vertical edge direction detector; a chrominance signal outputting unit for receiving the signal output from the multiplexer and then outputting a perfect chrominance signal; and a luminance signal outputting unit for receiving the signal output from the second delayer and the perfect chrominance signal and then outputting a perfect luminance signal.

Preferably, the first and second filters are each comb filters.

Preferably, the first filter includes a first subtractor for subtracting the signal output from the first delayer from the signal output from the second delayer and a first divider for dividing a signal output from the first subtractor by 2 and then outputting the first chrominance signal.

Preferably, the second filter includes a second subtractor for subtracting the signal output from the third delayer from the signal output from the second delayer and a first divider for dividing a signal output from the second subtractor by 2 and then outputting the second chrominance signal.

Preferably, the vertical edge direction detector includes: a third subtractor for subtracting the signal output from the fourth delayer from the signal output from the second delayer; a fourth subtractor for subtracting the digital composite video signal from the signal output from the second delayer; a first absolute value calculator for calculating an absolute value of signals output from the third subtractor; a second absolute value calculator for calculating an absolute value of signals output from the fourth subtractor; and a comparator for comparing the absolute values output from the first and second absolute value calculators.

Preferably, the chrominance signal outputting unit includes a low-pass filter for filtering the output of the multiplexer and a first limiter for limiting the output of the low-pass filter to a predetermined magnitude to output a perfect chrominance signal.

Preferably, the luminance signal outputting unit includes a subtractor for subtracting the perfect chrominance signal from the signal output from the second delayer to separate a luminance signal from the chrominance signal and a second limiter for limiting the luminance signal output from the subtractor to a predetermined magnitude to output a perfect luminance signal.

Based on the vertical edge direction, the digital composite video signal can be individually separated into the chrominance signal and the luminance signal, from which cross-luminance and cross-chrominance are substantially eliminated.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The above object and advantages of the present invention will become more apparent by describing in detail a preferred embodiment thereof with reference to the attached drawings in which.

DETAILED DESCRIPTION OF PREFERRED EMBODIMENTS

Figure 1:
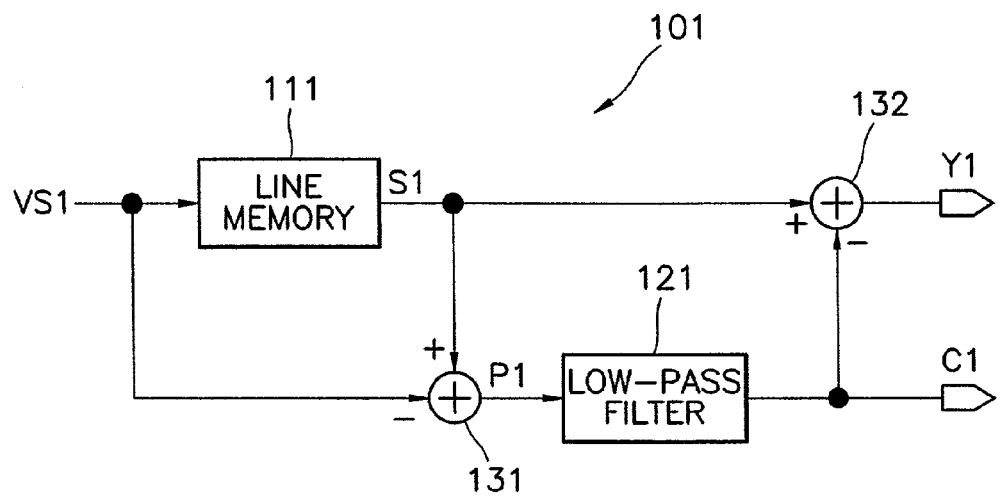
FIGS. 1 and 2 are block diagrams of conventional apparatus for separating luminance and chrominance signals.
Figure 2:
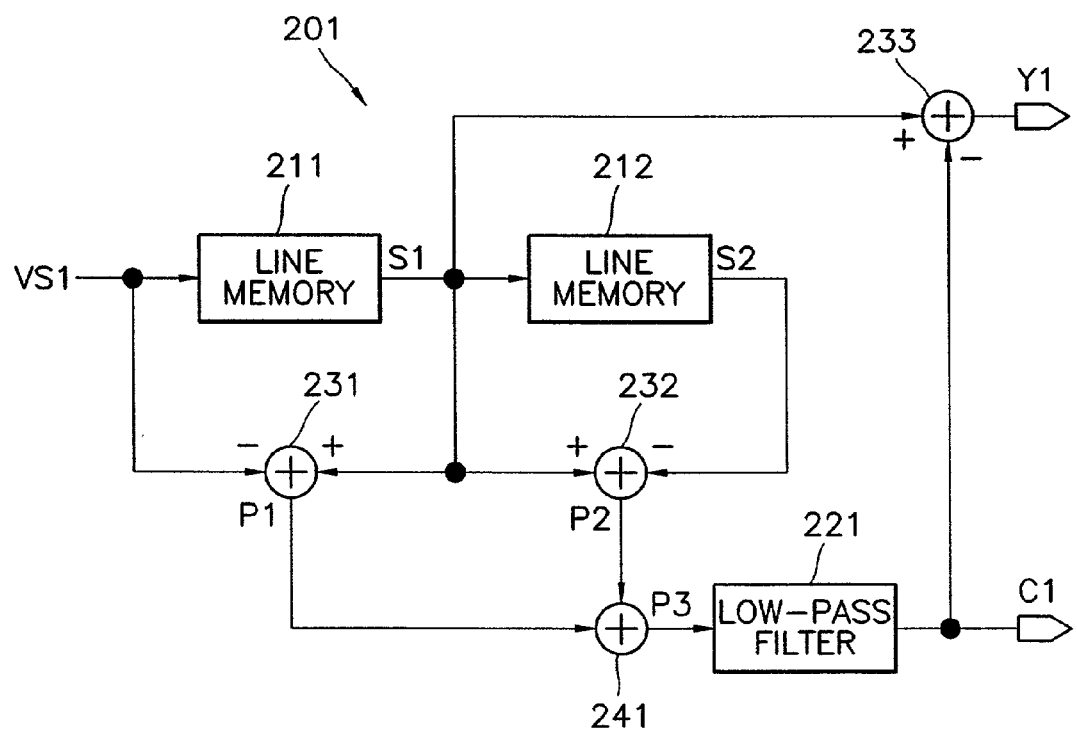

Hereinafter, the present invention will be described in detail by explaining a preferred embodiment of the present invention with reference to the attached drawings. Like reference numerals in the drawings denote the same members.

Figure 3:
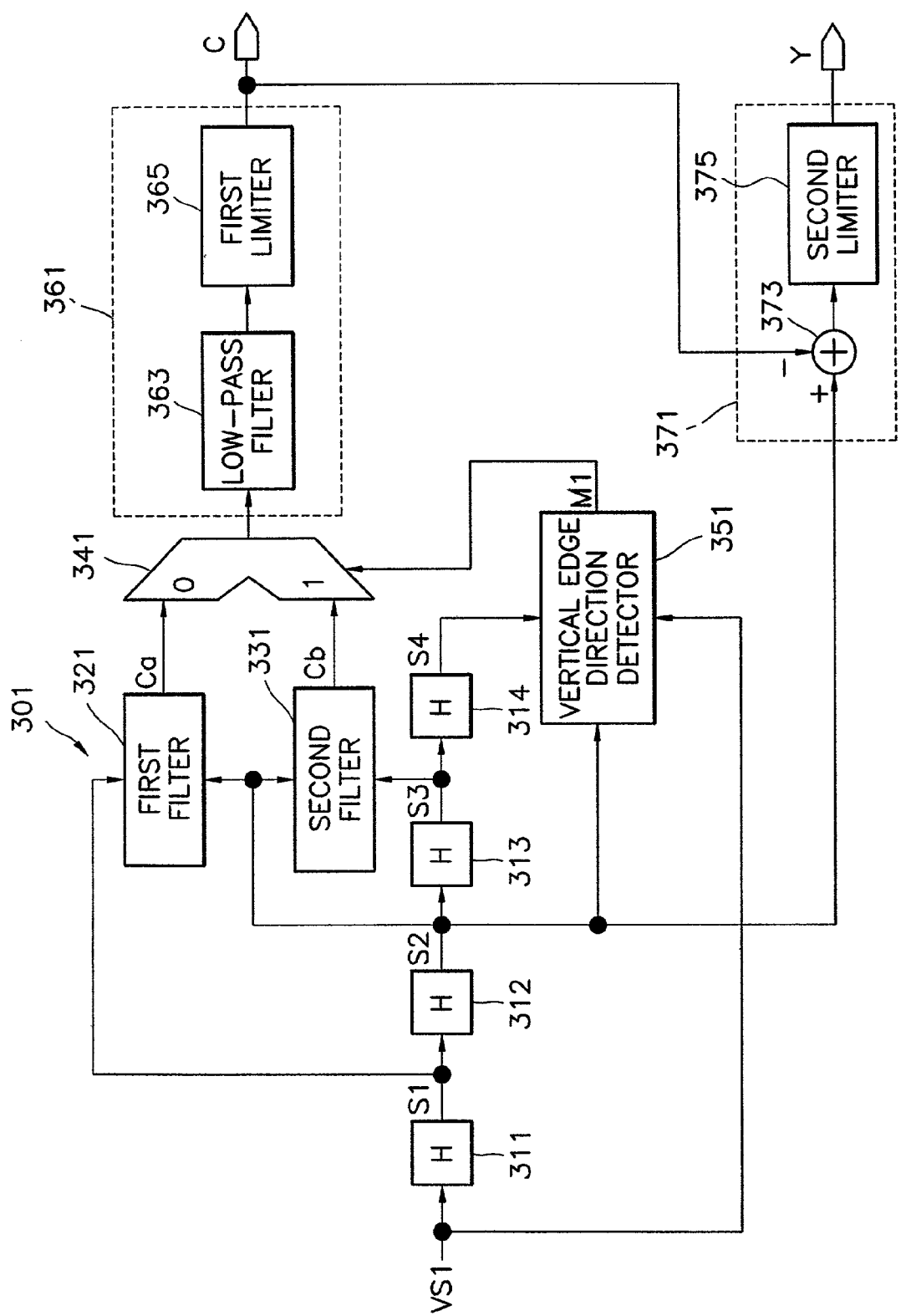
FIG. 3 is a block diagram of an apparatus for separating luminance and chrominance signals according to a preferred embodiment of the present invention.

FIG. 3 is a block diagram of an apparatus for separating luminance and chrominance signals according to a preferred embodiment of the present invention. Referring to FIG. 3, the apparatus includes first, second, third, and fourth delayers 311, 312, 313, and 314, first and second filters 321 and 331, a vertical edge direction detector 351, a multiplexer 341, a chrominance signal outputting unit 361, and a luminance signal outputting unit 371.

The first delayer 311 delays a digital video composite signal VS1 by 1 horizontal period and then outputs it as a signal S1. Here, the digital composite video signal is obtained by passing an NTSC video composite signal through an analog/digital converter (not shown).

The second delayer 312 receives the signal S1, delays it by 1 horizontal period, and outputs a signal S2 that is delayed by 2 horizontal periods.

The third delayer 312 receives the signal S2, delays it by 1 horizontal period, and outputs a signal S3 that is delayed by 3 horizontal periods.

The fourth delayer 314 receives the signal S3, delays it by 1 horizontal period, and outputs a signal S4 that is delayed by 4 horizontal periods.

The first filter 321, i.e., a first comb filter, receives the signals S1 and S2 output from the first and second delayers 311 and 312 and separates a chrominance signal Ca from the signals S1 and S2.

The second filter 322, i.e., a second comb filter, receives the signals S2 and S3 output from the second and third delayers 312 and 313 and separates a chrominance signal Cb from the signals S2 and S3.

The vertical edge direction detector 351 receives the signals S2 and S4 output from the second and fourth delayers 312 and 314, receives the digital composite video signal VS1, and detects a vertical edge direction.

The multiplexer 341 outputs any one of the signals Ca and Cb output from the first and second filters 321 and 331 according to a signal M1 output from the vertical edge direction detector 351.

The chrominance signal outputting unit 361 receives the output of the multiplexer 341 to output a perfect chrominance signal C from which cross-chrominance is completely eliminated. The chrominance signal outputting unit 361 includes a low-pass filter 363 for filtering the output of the multiplexer 341 and passing through only required bands, and a first limiter 365 for limiting the output of the low-pass filter 363 up to a predetermined magnitude and outputting a perfect chrominance signal C.

The luminance signal outputting unit 371 receives the signal S2 output from the second delayer 312 and the chrominance signal C to output a luminance signal Y from which cross-luminance is substantially eliminated. The luminance signal outputting unit 371 includes a subtractor 373 for subtracting the chrominance signal C from the signal S2 output from the second delayer 312 to separate the luminance signal Y from the chrominance signal C, and a second limiter 375 for limiting the luminance signal Y output from the subtractor 373 up to a predetermined magnitude and outputting the luminance signal Y.

Figure 4:
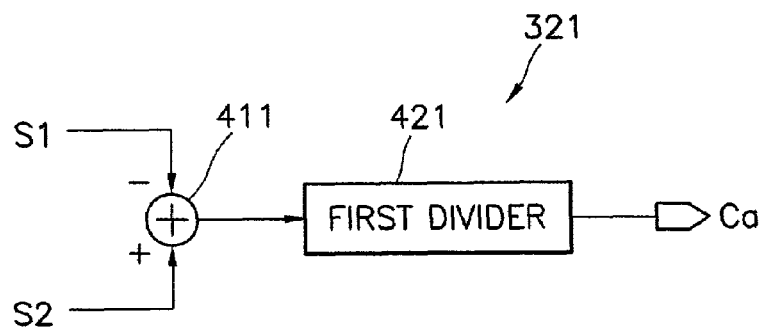
FIG. 4 is a detailed diagram of a first comb filter shown in FIG. 3.

FIG. 4 is a block diagram of the first comb filter shown in FIG. 3. Referring to FIG. 4, the first comb filter includes a first subtractor 411 and a first divider 421.

The first subtractor 411 receives the signals S1 and S2 output from the first and second delayers 311 and 312 and subtracts the signal S1 from the signal S2.

The first divider 421 divides the output of the first subtractor 411 by 2 to output a signal Ca output from the first filter 321, i.e., a first chrominance signal.

Figure 5:
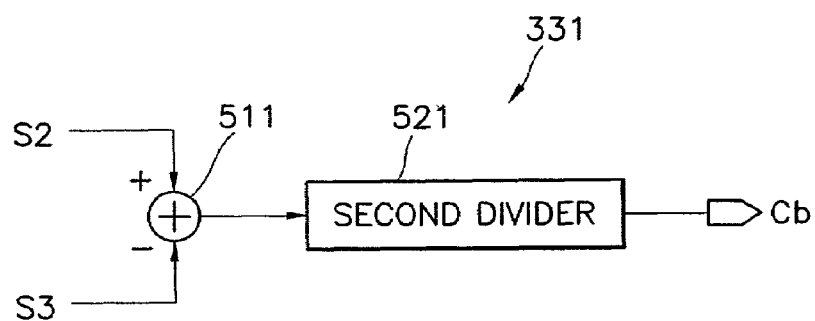
FIG. 5 is a detailed diagram of a second comb filter shown in FIG. 3.

FIG. 5 is a block diagram of the second comb filter shown in FIG. 3. Referring to FIG. 5, the second comb filter includes a second subtractor 511 and a second divider 521.

The second subtractor 511 receives the signals S2 and S3 output from the second and third delayers and subtracts the signal S3 from the signal S2.

The second divider 521 divides the output of the second subtractor 511 by 2 to output a signal Cb from the second filter 331, i.e., a second chrominance signal.

Figure 6:
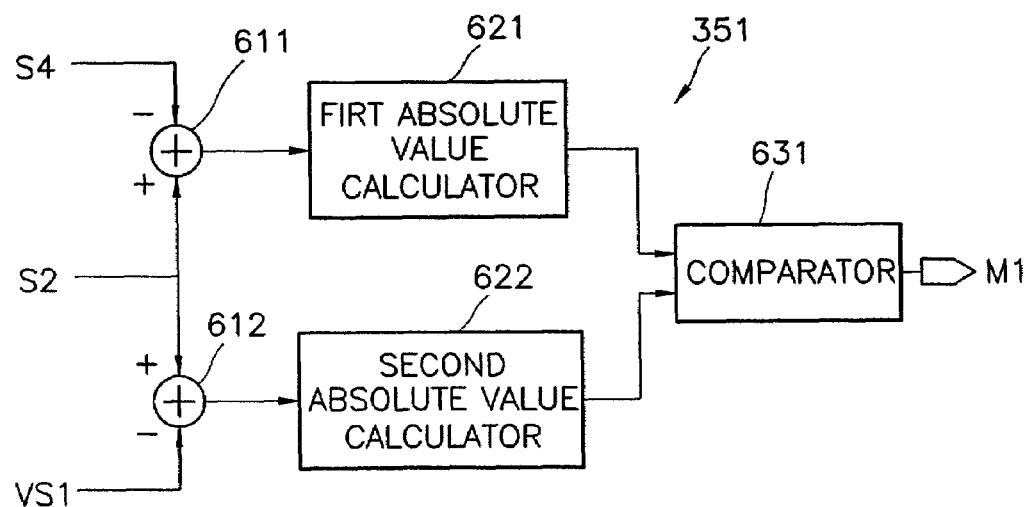
FIG. 6 is a detailed diagram of a vertical edge direction detector shown in FIG. 3.

FIG. 6 is a block diagram of the vertical edge direction detector 351 shown in FIG. 3. Referring to FIG. 6, the vertical edge direction detector 351 includes third and fourth subtractors 611 and 612, first and second absolute value calculators 621 and 622, and a comparator 631.

The third subtractor 611 subtracts a signal S4 output from the fourth delay 612 from the signal S2 output from the second delayer 312.

The fourth subtractor 612 subtracts the digital composite video signal VS1 from the signal S2 output from the second delayer 312.

The first absolute value calculator 621 calculates the absolute value of a signal output from the third subtractor 611.

The second absolute value calculator 622 calculates the absolute value of a signal output from the fourth subtractor 612.

The comparator 631 compares outputs of the first and second absolute calculators 621 and 622 and then detects a vertical edge direction.

Figure 7:
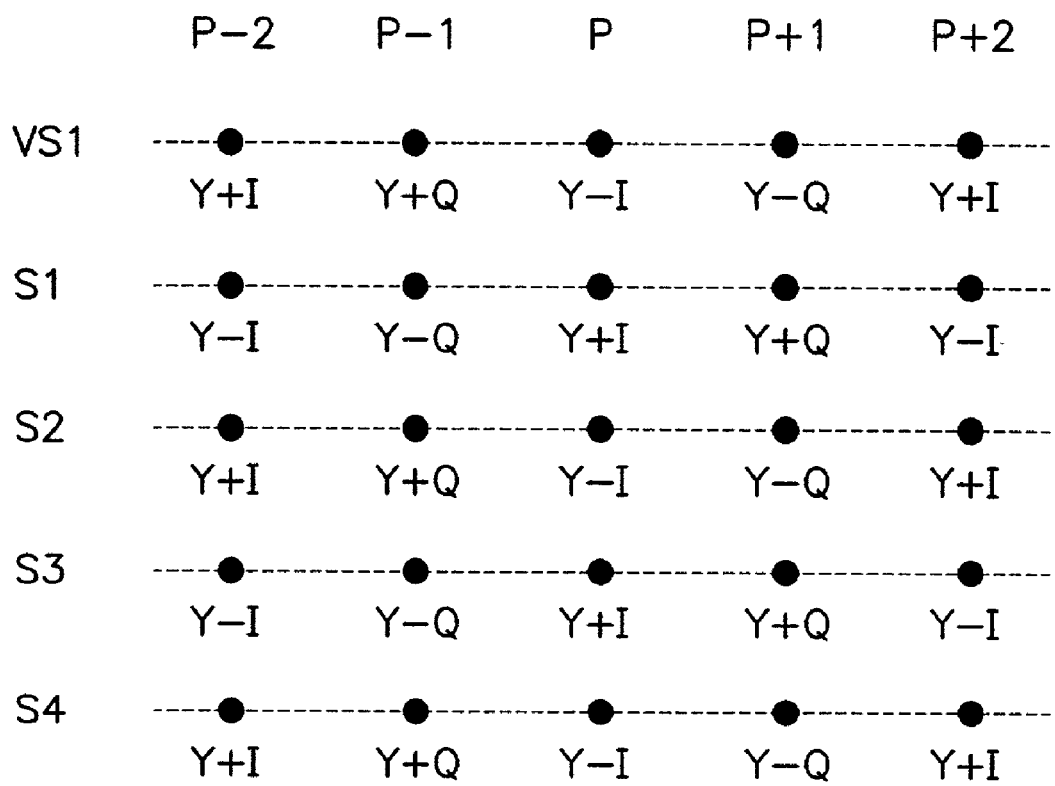
FIG. 7 shows the arrangement of data of a digital composite video signal.

FIG. 7 shows the arrangement of data of the digital composite video signal VS1, and delayed signals S1, S2, S3, and S4. As shown in FIG. 7, the digital composite video signal VS1 and the delayed signals S1, S2, S3, and S4 are 180° out of phase and have opposite signs against chrominance signals.

The process of separating a luminance signal and a chrominance signal by the luminance/chrominance signal separating apparatus 301 shown in FIG. 3 will be described with reference to FIGS. 4 through 7.

The first subtractor 411 subtracts the signal S1, which is delayed by 1 horizontal period, from the signal S2, which is delayed by 2 horizontal periods, and then outputs signals 2I, 2Q, −2I, −2Q, and 2I. The first divider 421 divides the signals output from the first subtractor 411 by 2 and then outputs signals I, Q, −I, −Q, and I. The first comb filter removes the luminance signal from the signal S2 delayed by 2 horizontal periods to output only the chrominance signal. Thus, the phase of the chrominance signal is maintained to be the same.

The second subtractor 511 subtracts the signal S3, which is delayed by 3 horizontal periods, from the signal S2, which is delayed by 2 horizontal periods, and then outputs signals 2I, 2Q, −2I, −2Q, and 2I. The second divider 521 divides the signals output from the second subtractor 511 by 2 and then outputs I, Q, −I, −Q, and I. The second comb filter removes the luminance signal from the signal S2 delayed by 2 horizontal periods to output only the chrominance signal. Thus, the phase of the chrominance signal is maintained as it is.

The multiplexer 341 outputs any one of the first and second chrominance signals Ca and Cb based on the vertical edge direction output from the vertical edge direction detector 351. For example, if the first absolute value calculator 621 outputs a value smaller than a value output from the second absolute value calculator 622, the multiplexer 341 outputs the second chrominance signal Cb. Otherwise, the multiplexer 341 outputs the first chrominance signal Ca.

The vertical edge direction detector 351 detects the vertical edge direction according to the signals S2 and S4 delayed by 2 and 4 horizontal periods, respectively, in order to accurately detect the vertical edge direction by using signals closely correlated to digital composite video signal components.

The first absolute value calculator 621 outputs signals $\{\Delta(Y+I)a, \Delta(Y+Q)a, \Delta(Y-I)a, \Delta(Y-Q)a,$ and $\Delta(Y+I)a\}$, and the second absolute value calculator 622 outputs $\{\Delta(Y+I)b, \Delta(Y+Q)b, \Delta(Y-I)b, \Delta(Y-Q)b,$ and $\Delta(Y+I)b\}$. Here, "a" represents the signal S4, which is delayed by a horizontal period, passing through the first absolute value calculator 621, and "b" represents the digital composite video signal VS1 passing through the second absolute value calculator 622.

Absolute values of differential signals of the signals S2 and S3 delayed by 2 and 3 horizontal periods, respectively, are $\{\Delta(Y+2I)a', \Delta(Y+2Q)a', \Delta(Y-2I)a', \Delta(Y-2Q)a',$ and $\Delta(Y+2I)a'\}$, and absolute values of differential signals of the signals S2 and S1 delayed by 2 and 1 horizontal periods, respectively, are $\{\Delta(Y+2I)b', \Delta(Y+2Q)b', \Delta(Y-2I)b', \Delta(Y-2Q)b',$ and $\Delta(Y+2I)b'\}$. Here, "a'" represents the signal S4, which is delayed by 4 horizontal periods, passing through the first absolute value calculator 621, and "b'" represents the digital composite video signal VS1 passing through the second absolute value calculator 622.

Here, the comparison of values represented by "a" and "b" is more advantageous to the correlation between these values than the comparison of values represented by "a'" and "b'". In the case of a flat image pattern, both $\{\Delta(Y+I)a\}$ and $\{\Delta(Y+I)b\}$ are close to "0". Thus, it is easy to compare and select the two values. Meanwhile, both $\{\Delta(Y+2I)a'\}$ and $\{\Delta(Y+2I)b'\}$ are large values, i.e., (2I). Thus, it is not easy to compare and select the two values $\{\Delta(Y+2I)a'\}$ and $\{\Delta(Y+2I)b'\}$.

Accordingly, more correlative first and second chrominance signals Ca and Cb are selected from the comparison of a value of the signal S4 delayed by 4 horizontal periods output from the first absolute value calculator 621 with a value of the digital composite video signal SV1 output from the second absolute value calculator 622. Thus, resolution degradation due to cross-chrominance can be prevented. In particular, since edge portions are comb-filtered by using similar information, more optimal effects can be obtained as compared with the conventional method.

As described above, according to the present invention, the vertical edge direction is detected based on more closely correlated ones of the signals S1–S4 which are delayed by horizontal periods. Based on the vertical edge direction, the digital composite video signal VS1 can be individually separated into the chrominance signal C and the luminance signal Y, from which cross-luminance and cross-chrominance are substantially eliminated.

While this invention has been particularly shown and described with references to preferred embodiments thereof, it will be understood by those skilled in the art that various changes in form and details may be made herein without departing from the spirit and scope of the invention as defined by the appended claims.

What is claimed is

1. An apparatus for separating luminance and chrominance signals; the apparatus comprising:
   first, second, third, and fourth delayers connected to a digital composite video signal in series, the first, second, third, and fourth delayers for delaying input signals each by 1 horizontal period;
   a first filter for separating a first chrominance signal from signals output from the first and second delayers;
   a second filter for separating a second chrominance signal from signals output from the second and third delayers;
   a vertical edge direction detector for detecting a vertical edge direction based on signals output from the second and fourth delayers and the digital composite video signal;
   a multiplexer for outputting one of the first and second chrominance signals according to a signal output from the vertical edge direction detector;
   a chrominance signal outputting unit for receiving the signal output from the multiplexer and for outputting a perfect chrominance signal, the chrominance signal outputting unit comprising:
  a low-pass filter for filtering the output of the multiplexer; and
  a first limiter for limiting the output of the low-pass filter to a predetermined magnitude to output the perfect chrominance signal; and
a luminance signal outputting unit for receiving the signal output from the second delayer and the perfect chrominance signal and for outputting a perfect luminance signal.

2. The apparatus of claim 1, wherein the first and second filters are each comb filters.

3. The apparatus of claim 1, wherein the first filter comprises:
  a first subtractor for subtracting the signal output from the first delayer from the signal output from the second delayer; and
  a first divider for dividing a signal output from the first subtractor by 2 and outputting the first chrominance signal.

4. The apparatus of claim 1, wherein the second filter comprises:
  a second subtractor for subtracting the signal output from the third delayer from the signal output from the second delayer; and
  a second divider for dividing a signal output from the second subtractor by 2 and outputting the second chrominance signal.

5. The apparatus of claim 1, wherein the vertical edge direction detector comprises:
  a third subtractor for subtracting the signal output from the fourth delayer from the signal output from the second delayer;
  a fourth subtractor for subtracting the digital composite video signal from the signal output from the second delayer;
  a first absolute value calculator for calculating an absolute value of signals output from the third subtractor;
  a second absolute value calculator for calculating an absolute value of signals output from the fourth subtractor; and
  a comparator for comparing the absolute values output from the first and second absolute value calculators.

6. The apparatus of claim 1, wherein the luminance signal outputting unit comprises:
  a subtractor for subtracting the perfect chrominance signal from the signal output from the second delayer to separate a luminance signal; and
  a second limiter for limiting the luminance signal output from the subtractor to a predetermined magnitude to output the perfect luminance signal.

7. The apparatus of claim 1, wherein the first through fourth delayers each comprise line memories.

8. An apparatus for separating luminance and chrominance signals, the apparatus comprising:
  first, second, third, and fourth delayers connected to a digital composite video signal in series, the first, second, third, and fourth delayers for delaying input signals each by 1 horizontal period;
  a first filter for separating a first chrominance signal from signals output from the first and second delayers;
  a second filter for separating a second chrominance signal from signals output from the second and third delayers;
  a vertical edge direction detector for detecting a vertical edge direction based on signals output from the second and fourth delayers and the digital composite video signal;
  a multiplexer for outputting one of the first and second chrominance signals according to a signal output from the vertical edge direction detector;
  a chrominance signal outputting unit for receiving the signal output from the multiplexer and for outputting the perfect chrominance signal; and
  a luminance signal outputting unit for receiving the signal output from the second delayer and the perfect chrominance signal and for outputting a perfect luminance signal, wherein the luminance signal outputting unit comprises:
    a subtractor for subtracting the perfect chrominance signal from the signal output of the second delayer to separate a luminance signal; and
    a second limiter for limiting the luminance signal output from the subtractor to a predetermined magnitude to output a perfect luminance signal.

9. The apparatus of claim 8, wherein the first and second filters are each comb filters.

10. The apparatus of claim 8, wherein the first filter comprises:
  a first subtractor for subtracting the signal output from the first delayer from the signal output from the second delayer; and
  a first divider for dividing a signal output from the first subtractor by 2 and outputting the first chrominance signal.

11. The apparatus of claim 8, wherein the second filter comprises:
  a second subtractor for subtracting the signal output from the third delayer from the signal output from the second delayer; and
  a second divider for dividing a signal output from the second subtractor by 2 and outputting the second chrominance signal.

12. The apparatus of claim 8, wherein the vertical edge direction detector comprises:
  a third subtractor for subtracting the signal output from the fourth delayer from the signal output from the second delayer;
  a fourth subtractor for subtracting the digital composite video signal from the signal output from the second delayer;
  a first absolute value calculator for calculating an absolute value of signals output from the third subtractor;
  a second absolute value calculator for calculating an absolute value of signals output from the fourth subtractor; and
  a comparator for comparing the absolute values output from the first and second absolute value calculators.

13. The apparatus of claim 8, wherein the chrominance signal outputting unit comprises:
  a low-pass filter for filtering the output of the multiplexer; and
  a first limiter for limiting the output of the low-pass filter to a predetermined magnitude to output the perfect chrominance signal.

14. The apparatus of claim 8, wherein the first through fourth delayers each comprise line memories.

* * * * *